(12) United States Patent
Villatoro et al.

(10) Patent No.: US 7,936,461 B2
(45) Date of Patent: May 3, 2011

(54) ALL-OPTICAL FIBER INTERFEROMETER

(75) Inventors: Agustin Joel Villatoro, Barcelona (ES); Valerio Pruneri, Barcelona (ES); Goncal Badenes, Barcelona (ES)

(73) Assignees: Institut De Ciencies Fotoniques, Fundacio Privada, Barcelona (ES); Institucio Catalan De Recerca I Estudis Avancats, Barcelona (ES)

( * ) Notice: Subject to any disclaimer, the term of this patent is extended or adjusted under 35 U.S.C. 154(b) by 801 days.

(21) Appl. No.: 11/962,430

(22) Filed: Dec. 21, 2007

(65) Prior Publication Data

US 2010/0265514 A1    Oct. 21, 2010

(30) Foreign Application Priority Data

Dec. 26, 2006 (ES) .................................. 200700008

(51) Int. Cl.
*G01B 9/02* (2006.01)
(52) U.S. Cl. .................................................... 356/477
(58) Field of Classification Search ................. 356/477; 385/12
See application file for complete search history.

(56) References Cited

U.S. PATENT DOCUMENTS

| | | | | |
|---|---|---|---|---|
| 2006/0263024 A1* | 11/2006 | Dong et al. | .................... | 385/125 |
| 2009/0123121 A1* | 5/2009 | Dong et al. | .................... | 385/124 |
| 2010/0157418 A1* | 6/2010 | Dong et al. | ................ | 359/341.3 |
| 2010/0322575 A1* | 12/2010 | Dong et al. | .................... | 385/123 |

OTHER PUBLICATIONS

Article entitled "Photonic Crystal Fibers", by Philip Russell, Science, vol. 299, pp. 358-362, Jan. 17, 2003.
Article entitled "Mach-Zehnder Interferometer Formed in a Photonic Crystal Fiber Based on a pair of Long-period Fiber, Gratings" by John H. Lim, et al., Optics Letters, vol. 29, No. 4, pp. 346-348, Feb. 15, 2004.
Article entitled "Two-mode Photonic Crystal Fibers", by Wei Jin, et al., Optics Express, vol. 13, No. 6, pp. 2082-2088, Mar. 21, 2005.
Article entitled, "Temperature Sensitivity of a Two-Mode Photonic Crystal Fiber Interferometric Sensor", by J. Ju, et al., IEEE Photonics Technology Letters, vol. 18, No. 20, pp. 2168-2170, Oct. 15, 2006.
Article entitled, "Compact Modal Interfereometer Built With Tapered Microstructured Optical Fiber", by, J. Villatoro, et al., IEEE Photonics Technology Letters, vol. 18, No. 11, pp. 1258-1260, Jun. 1, 2006.

* cited by examiner

*Primary Examiner* — Patrick J Connolly
(74) *Attorney, Agent, or Firm* — McCormick, Paulding & Huber LLP

(57) ABSTRACT

A compact and stable interferometer is easily built only with fusion splices. The air-holes of a microstructured fiber are intentionally collapsed in the vicinity of the splices and this broadens the propagating optical mode, allowing coupling from core to cladding modes. The transmission spectrum is sinusoidal and of single frequency, indicating predominant interference between the fundamental core mode (7) and a cladding mode (6). A regular interference spectrum can be observed from 650 nm to 1600 nm with fringe visibility reaching 80%. The fringe spacing is inversely proportional to the distance between the splices. This behavior has a significant impact in optical sensing and communications and so the interferometer can be applied for strain sensing. The device comprises two splices (5) of a microstructured optical fiber (1), said splices (5) determining two regions in which the air-holes (4) are collapsed, separated a length (L) along which said two modes are excited.

10 Claims, 5 Drawing Sheets

ALL-OPTICAL FIBER INTERFEROMETER

CROSS REFERENCE TO RELATED APPLICATION

This application is entitled to the benefit of and incorporates by reference essential subject matter disclosed in Spanish Patent Application No. P200700008 filed on Dec. 26, 2006.

FIELD OF THE INVENTION

The present invention relates in general to manufacturing of optical fibre based devices and, more particularly, to an interferometer based on micro-structured optical fibers that can be used in a sensor element applicable for measuring diverse physical parameters, which are translated into output interference changes.

BACKGROUND OF THE INVENTION

In optics, all-fiber interferometers are important devices since they are useful in diverse applications; ultrahigh-resolution metrology and light modulation are just two examples. Fiber interferometers can also be key devices in modern instruments such as gyroscopes.

Numerous different approaches have been proposed to construct interferometers with conventional optical fibers.

The advent of the so-called micro-structured optical fibers (MOFs) opens many other alternatives to construct interferometers that can be very useful for wide application areas.

A micro-structured optical fiber (MOF), also known as photonic-crystal fiber (PCF), is a new class of optical fiber which has a cross-section (normally uniform along the fiber length) micro-structured from two or more materials, most commonly periodically arranged over much of the cross-section, usually as a cladding surrounding a core (or several cores) where light is confined. In fact, in literature, two types of MOF are known, depending on the physical mechanism that is responsible for confinement and guiding of optical light. One of these types of MOF is characterized in that the light is guided by total internal reflection (TIR). In the TIR case, the core is made of high refractive index material surrounded by a cladding made of a suitable arrangement of high and low refractive index regions, typically a pattern of microscopic air-holes in the transverse plane running along the whole fiber length. For this reason this kind of MOF is also named 'holey fiber'.

Unlike conventional optical fibers, MOFs may be single mode from the visible to the near infrared. In addition, one can design MOFs with multiple cores or with air holes of different shapes (see "Photonic Crystal Fibers" by Philip Russell, SCIENCE, vol. 299, pp. 358-362, 17 Jan. 2003).

Novel modal interferometers have been constructed by cascading two identical long-period gratings (see "Mach-Zehnder interferometer formed in a photonic crystal fiber based on a pair of long-period gratings" by Jong H. Lim et al., OPTICS LETTERS, vol. 29, No. 4, pp. 346-348, 15 Feb. 2004) or by using a MOF with air holes of different diameters (see "Two-mode photonic crystal fibers" by J. Ju et al., OPTICS EXPRESS, vol. 13, No. 6, pp. 2082-2088, 21 Mar. 2005). These approaches suffer from several construction limitations, though.

In short, Mach-Zehnder interferometers based on long-period fiber grating pairs formed in conventional single-mode fibers have been widely studied. But, unlike in conventional single-mode fibers, it is rather difficult to form two identical 3-dB long-period fiber grating pairs in a PCF. The cladding mode of the single-mode fiber is completely understood but for a PCF the cladding mode is not well defined.

Mechanically inducing two identical long-period fiber gratings in the PCF, as Jong H. Lim et al. propose, in order to make an all-fiber Mach-Zehnder interferometers helps to study the properties of the cladding modes guided along the PCF, but it does not achieve to have them controlled and makes the modal guiding behavior restrictively dependent upon the severe construction requirements of the long-period fiber grating pairs in the PCF.

With regards to two-mode PCFs described by J. Ju et al., these fibers are characterized by: requiring critical conditions of injection and polarization of the light source into the fiber, having instability and strong dependency in temperature (as it is demonstrated in "Temperature sensitivity of a two-mode photonic crystal fiber interferometric sensor", J. Jian et al., IEEE PHOTONICS TECHNOLOGY LETTERS, vol. 18, No. 20, pp. 2168-2170, 15 Oct. 2006). In addition to these restrictions, excitation of the two modes is exclusively supported by a PCF constructed under very specific parameters: determined air-holes size and separation distance between air-holes.

Another way for construction of compact interferometers recently reported is by combining MOFs with tapering technology (as in "Compact modal interferometer built with tapered micro-structured optical fiber" by J. Villatoro et al., IEEE PHOTONICS TECHNOLOGY LETTERS, vol. 18, No. 11, pp. 305-307, 1 Jun. 2006). The fiber is tapered by gently elongating it while a zone of length $L_0$ is heated with a high temperature oscillating flame torch. With this "slow-and-hot" tapering process, a uniform-waist of width $\rho_0$ is reached in the tapered MOF, in which the air-holes collapse and so is transformed into a solid unclad multimodal region. The fundamental $HE_{11}$ mode of the holey fiber is coupled to the $HE_{1m}$ modes of the solid fiber. The contracting and expanding zones are equivalent to couplers in a fiber-optic Mach-Zehnder interferometer, while the modes of the solid section are equivalent to the arms. The improvement of this solution lies in the possibility of adjusting the geometrical parameters during fabrication of the interferometric device. Nonetheless, the disadvantage of this interferometer is an irregular and unpredictable oscillatory pattern.

All these techniques and others so far reported for interferometer fabrication based on MOFs present severe challenges in terms of complexity and/or manufacturability.

SUMMARY OF THE INVENTION

The present invention is intended to resolve the problem outlined above on the current necessity of simplifying the fabrication and increasing the manufacturability of in-fiber integrated interferometric and sensing devices using photonic-crystal fibers or micro-structured optical fibers (MOFs).

It is an object of the present invention to provide a stable interferometer via fusion splicing of a micro-structured optical fiber.

Thus, an aspect of the present invention relates to an all-optical fiber interferometer, as defined in claim 1, which comprises an index-guiding single-mode micro-structured optical fiber which has its air-holes collapsed in two regions separated by a fragment of said micro-structured optical fiber in a length along which two modes are excited. In order to obtain these two regions, such fragment or length of the micro-structured optical fiber (MOF) is spliced with two respective optical fibers, which can be also MOFs or conventional optical fibers, by means of a standard fusion splicer apparatus.

When splicing together two MOFs, or a MOF and a conventional optical fiber, the air-holes of the MOF fragment collapse completely in the vicinity of the splice. Collapsing of the voids in a short region of the MOF is not a serious drawback of fusion splices, since it may introduce minimal losses when heating time and an electric current of the conventional electric-arc process for fusion splicing is conveniently (approximately 50%) reduced. By collapsing the air-holes, a zone of the MOF is transformed into a solid multimode optical fiber. In addition, the collapsing of the microscopic air-holes is exploited to hermetically seal the end of MOFs which simplifies their connectorization and increases their coupling efficiency. The cleaving and splicing processes take just a few minutes and can be carried out with standard fiber optics equipment.

Whereas most of the works dealing with MOFs currently made in the state of the art go after avoiding the collapsing of the air holes, here indeed said collapsing of the air holes in the MOF has an "unexpected" effect that allows the creation of this new constructed interferometric optical fiber device.

The collapsing of the air-holes, air-channels or voids of the MOF in a short region makes the fundamental MOF mode to spread out when the first splice is reached. Thanks to this phenomenon, it is possible to excite the fundamental mode and higher order modes of the MOF (here called core and cladding modes respectively for similarity to conventional fibres), in the fragment of MOF between the fusion splices. In fact, to be more precise, the higher order modes in MOFs (named cladding modes) are well confined within the boundary between the structure and air, while in conventional fibres cladding modes reach the outside boundary with air. It is clear though that high order modes in MOFs become 'true' cladding modes when the fibre cross section decreases (as in "Compact modal interferometer built with tapered microstructured optical fiber" by J. Villatoro et al., IEEE PHOTONICS TECHNOLOGY LETTERS, vol. 18, No. 11, pp. 305-307, 1 Jun. 2006), thus making the structure and related interferometers more sensitive to any refractive index change of surrounding medium (e.g. gas, liquid, etc. . . . ).

The excited modes are recombined by the second splice. In this interferometer, the two modes play the role of arms and the collapsed regions (splices) play the role of couplers or splitters, being a preferred embodiment of the invention an all-MOF Mach-Zehnder interferometer. The core and cladding modes have different propagation constants and accumulate a phase difference as they propagate over the length of the MOF between the splices. The propagation constants and the accumulated phase difference are wavelength dependent. Hence, if light is launched from a broadband optical source to the interferometer and the output light is fed to an optical spectrum analyzer, the resulting spectrum can be modulated according to the path length imbalance of the modes.

Thus, in the all-optical fiber interferometer constructed with these two fusion splices, the transmitted optical power present maxima at certain wavelengths and minima at others. The period of the intensity pattern is inversely proportional to the length of the MOF between the two splices. This interferometer exhibits truly sinusoidal and stable interference spectra observed over a broad wavelength range (around 800 nanometers bandwidth). Given the single frequency nature of the pattern only two modes (fundamental mode and one high order mode) are excited over a wavelength range from 650 to 1600 nanometers approximately. In addition, the visibility of intensity pattern that can be achieved (greater than 80%) indicates nearly perfect interference between the two modes.

The two-mode interferometer described here is simpler than those disclosed in the prior art, based on identical long-period gratings or two-mode MOFs, even having in common that the arms of the interferometer are typically two-modes, because in the present invention there is the possibility of controlling its construction by adjusting just one geometrical parameter of the MOF fragment (its length) and there are no temperature, light launching and polarization dependences requiring exterior control of the light by optical and mechanical means.

Any minute variation on the optical path length experienced by the two modes traveling in the central part of the device, which could be due e.g. to the modification of the physical length L or to changes in the difference of refractive index, modifies the phase difference between the interfering modes and makes the interference spectrum to displace. If e.g. the interferometer is subjected to longitudinal strain, the interference pattern is shifted to shorter wavelengths. In consequence, the device is applicable for strain sensing.

Note that a longitudinal strain applied to the all-optical fiber interferometer is considered one of the possible parameters to set an example of application for this invention in sensing, but there are other parameters that may affect the difference of refractive indices in the all-optical fiber interferometer rather than physical length and still translate into fringe pattern movement. The key for sensing by this all-optical fiber interferometer is to change the optical path difference between the two modes excited in the length of MOF, with optical path meaning the product of physical length and effective refractive index experience by each mode. Due to the fact that the high order mode is more spread spatially than the fundamental mode, any liquid on the fiber for example could affect its refractive index more than that of the fundamental, because of the higher vicinity of liquid to guided intensity. Commonly, if the two refractive indices vary in a different way as a consequence of any sensing parameter then the interference will move and detection occurs.

Therefore, other sensing applications can be envisaged since many physical parameters such as sound, vibration, temperature, pressure, etc., can be translated to changes in the optical path difference between the two excited modes and, in particular, to strain changes. Also, modifications in the medium surrounding the optical fibre like presence of liquids, gases, immuno-reactions, etc., result in changes in this optical length which in turn create changes in the output signal. The interferometers constructed with microstructured fibers are very attractive since they can have a significant impact in optical sensing and communications. The potential applications of the all-MOF interferometer presented here are just some examples and include also the possibility of modal or wavelength filtering, the fabrication of attenuators.

According to another aspect of the invention, there is provided an interferometric strain sensing device comprising the all-optical fiber interferometer previously described and at least one lineal moving element attached to at least one point of said all-optical fiber interferometer for straightening of at least the MOF fragment and introduction of micro elongations to the length of said MOF.

The construction of such devices defined here, comprising only two splices in a MOF separated a few tens of millimeters (the length of MOF in which the core and cladding modes are coupled can reach to 10 centimeters), is simple and fast since it only requires cleaving and fusion splicing. Another aspect of the present invention refers to a method for construction of an all-optical fiber interferometer, which comprises the following steps:

cleaving an index-guiding micro-structured optical fiber comprising at least four rings of air-holes and two single-mode optical fibers, which can be conventional or micro-structured optical fibers;

fusion splicing the index-guiding micro-structured optical fiber with the two single-mode optical fibers with a center-to-center separation between the two splices of a length not higher than 10 centimeters;

applying a heating time and an electric current for each of the two fusion splices so that tapering the air-holes of the MOF length until total collapse is allowed.

In this text, the term "comprises" and its derivations (such as "comprising", etc.) should not be understood in an excluding sense, that is, these terms should not be interpreted as excluding the possibility that what is described and defined may include further elements, steps, etc.

In the context of the present invention, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the term "about".

Additional advantages and features of the invention will become apparent from the detail description that follows.

BRIEF DESCRIPTION OF THE DRAWINGS

In order to provide for a better understanding of the invention, a set of drawings is provided, which should not be interpreted as restricting the scope of the invention, but just as an example of how the invention can be embodied. The drawings comprise the following figures.

DETAILED DESCRIPTION OF PREFERRED EMBODIMENTS

Figure 1:
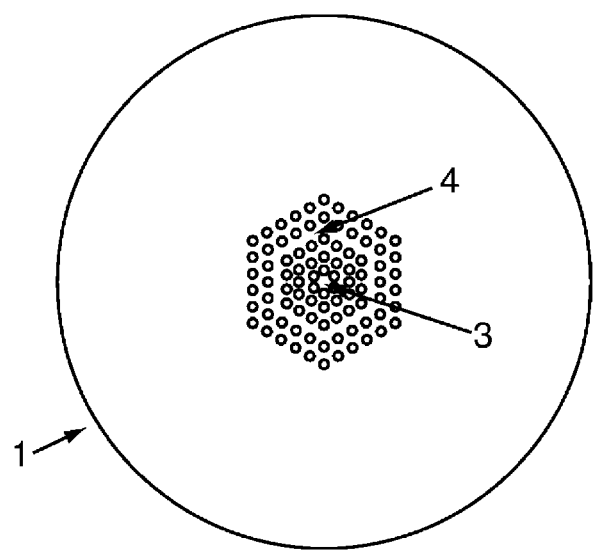
FIG. 1 shows a cross-section of a micro-structured optical fiber employed to construct a preferred embodiment of the present invention.

For the construction of a micro-structured Mach-Zehnder interferometer, an index-guiding micro-structured optical fiber (1) is used, consisting of a solid core (3) surrounded by rings of air holes (4), which can be arranged in a hexagonal pattern, as shown in FIG. 1. For example, it is possible to use commercially available MOF with a core of 11 µm in diameter, voids with average diameter of 2.7 µm, and the average separation between the voids of 5.45 µm. The fiber has an outer diameter of 125 µm. This type of MOF guides light by the modified total internal reflection principle. This index-guiding fiber is single mode from 620 nm to 1600 nm.

Figure 2:
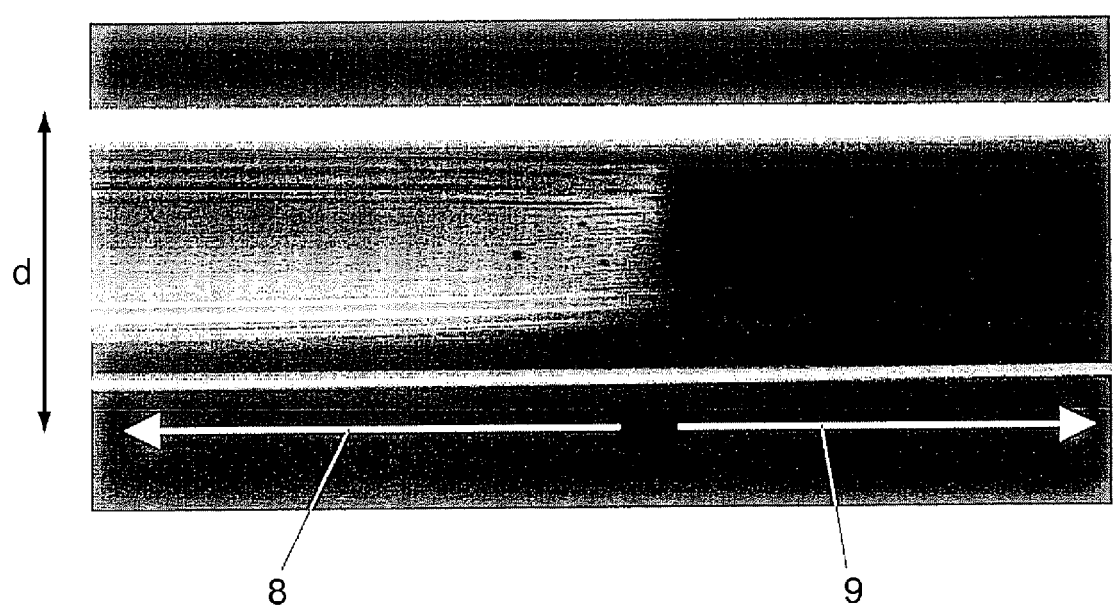
FIG. 2 shows a micro photograph of one of the two splices formed in the micro-structured optical fiber previously depicted, according to the object of the invention.

This all-MOF interferometer comprises two splices (5) in which the air holes (4) determining the holey region (8) of the MOF are fully collapsed, as shown in FIG. 2. The length of the collapsed region (9) in each splice (5) is about 300 micrometers. The collapsing of the air holes (4) makes the propagating light-beam to broaden, allowing to couple two electromagnetic modes: core mode (7) and cladding mode (6), in a length (L) of the micro-structured optical fiber (1) between the splices, depicted in FIG. 3 and determined by the center-to-center separation between its two collapsed regions (9).

Both splices are carried out with a conventional fusion splicer, as for instance Fitel S122A or an Ericsson splicer machine. Before splicing, the fibers are cleaved with a high-precision cleaver, for instance, Fitel model S325. In order to minimize the losses and to get robust splices, the heating time and current of the electrodes of the splicer are reduced from the default values, for fusion splicing of a conventional single mode fiber, by approximately 50%. Note from the image of FIG. 2 that the air holes or channels of the MOF—the horizontal lines of the micrograph—are tapered before being completely collapsed. Also, the outer diameter of the MOF is basically uniform even in the region with collapsed air channels.

The fabrication of the interferometer can be monitored in situ and in real time. To do so, a low-power light source, such as an LED with peak emission at 850 nm and 50 nm of spectral width, and a low-cost optical spectrometer can be used to monitor the interference spectrum. It must be pointed out that the losses of each splice, at 850 nm, are less than 2 dB and such losses can be further reduced with an optimization of the splicing process.

Figure 3:
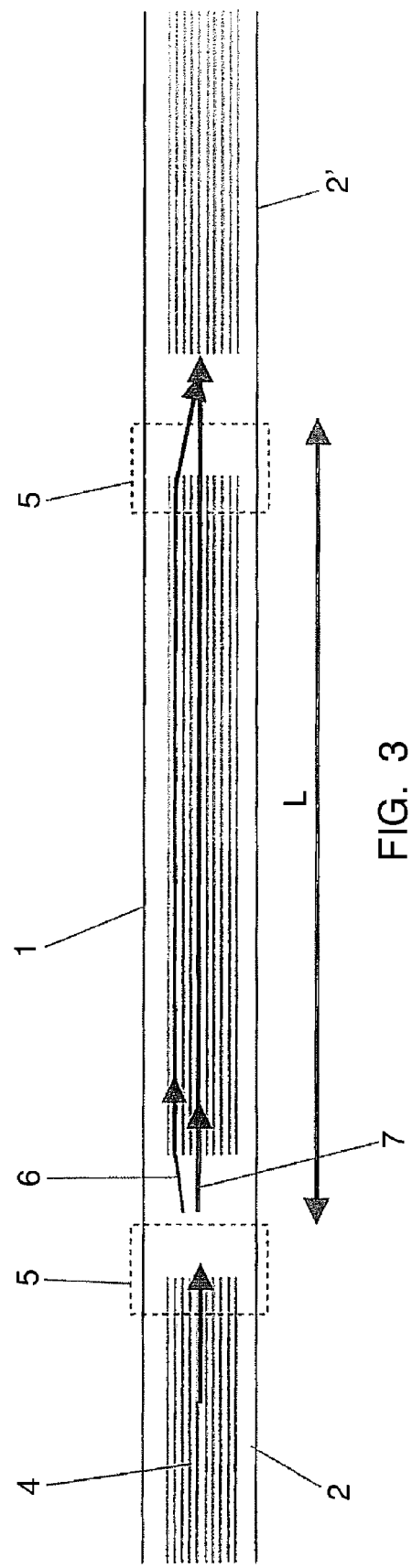
FIG. 3 shows a schematic representation of the all-micro-structured optical fiber interferometer, illustrating the splices as white areas and the horizontal lines correspond to the holey region of the micro-structured optical fibers.

FIG. 3 illustrates the broadening of the fundamental MOF mode or core (7) in the zone in which the air-holes gradually collapse, allowing the excitation of core (7) and cladding modes (6) in the length (L) of MOF between the splices. The modes are then recombined by the second splice. The two excited modes of the fiber between the splices play the role of arms and the collapsed regions (9) play the role of couplers or splitters in the Mach-Zehnder interferometer. The core (7) and cladding modes (6) have different propagation constants and accumulate a phase difference as they propagate over the MOF length (L). It is important to collapse the air holes (4) in a short region, 300 micrometers or less, since the collapsing of the channels allows the coupling from the fundamental mode (6) to a cladding mode (7). It is fundamental to have index-guiding micro-structured optical fiber, because such broadening does not occur with conventional optical fiber.

Figure 4:
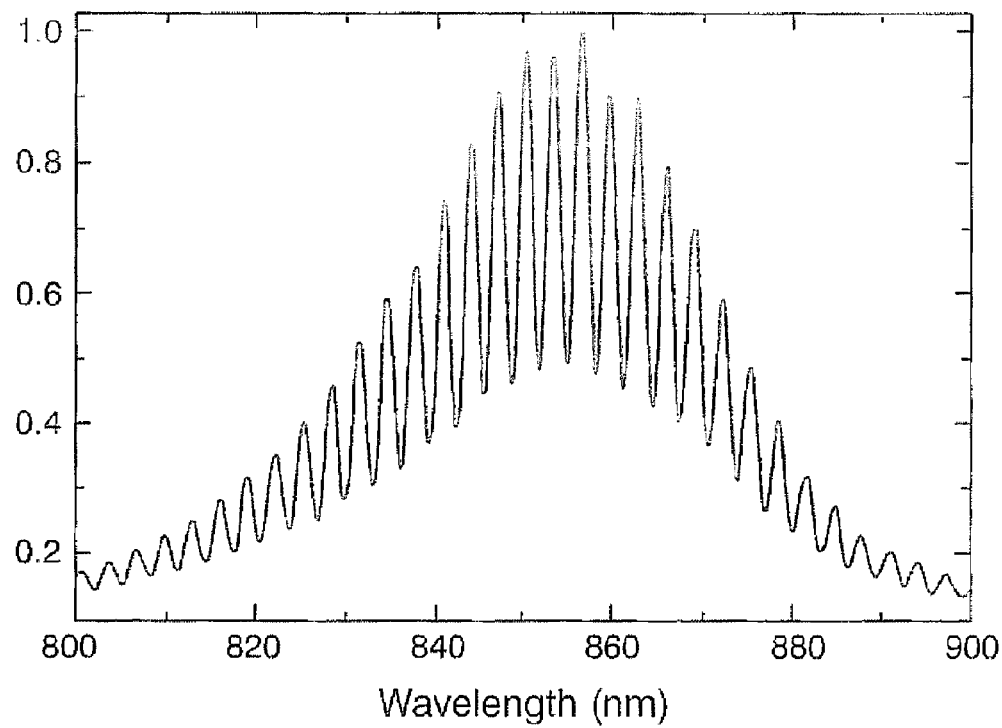
FIG. 4 shows a normalized transmission spectrum with a central wavelength around 850 nm of the all-micro-structured optical fiber interferometer, according to a possible embodiment of this invention with a length of micro-structured optical fiber L=6.35 cm.
Figure 5:
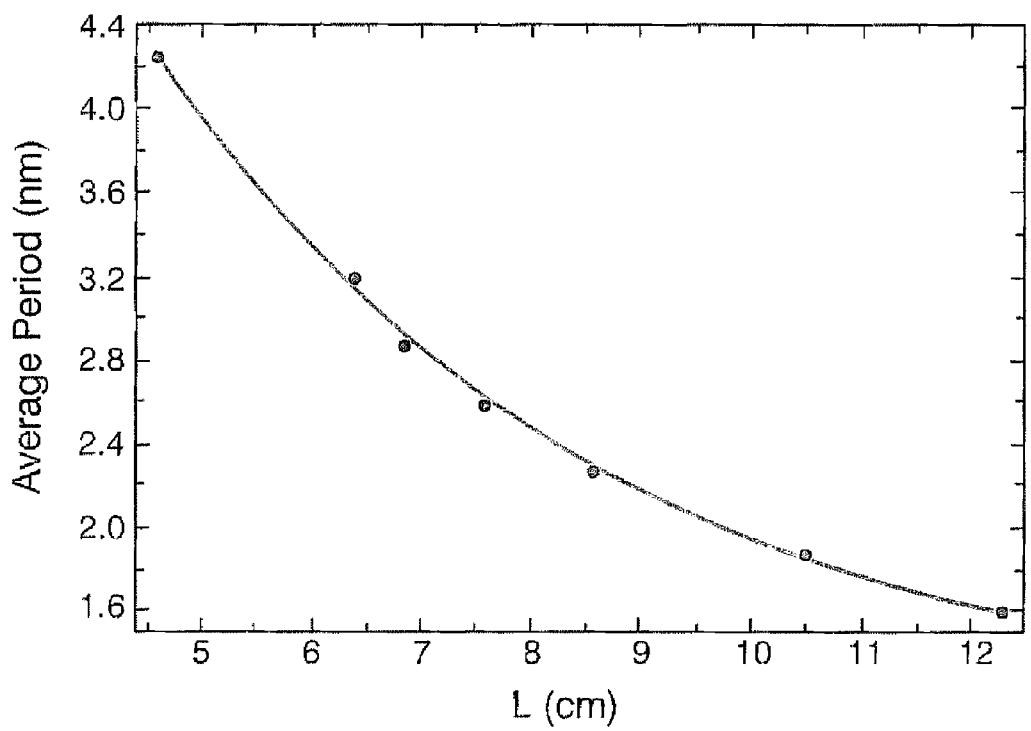
FIG. 5 shows a graphical representation of average period of the all-micro-structured optical fiber interferometer versus the length L of micro-structured optical fiber between the splices, measured in centimeters, being the dots experimental points and the continuous line is an exponential fitting to the points.

The interference spectrum, drawn in FIG. 4, has a Gaussian-like envelope owing to the output spectrum of the LED. During the measurements the length (L) of fiber between the splices, it is held straight since the interference pattern is strongly affected by bending. In this regard, the proposed all-MOF interferometer is similar to those constructed with dual-core MOFs. The interference fringes become closer as the length (L) increases; this property is summarized in FIG. 5, wherein the average period ($\Delta$) of the interferometer decreases as the length (L) increases following the law: $\Delta \cdot L$=constant.

Figure 6:
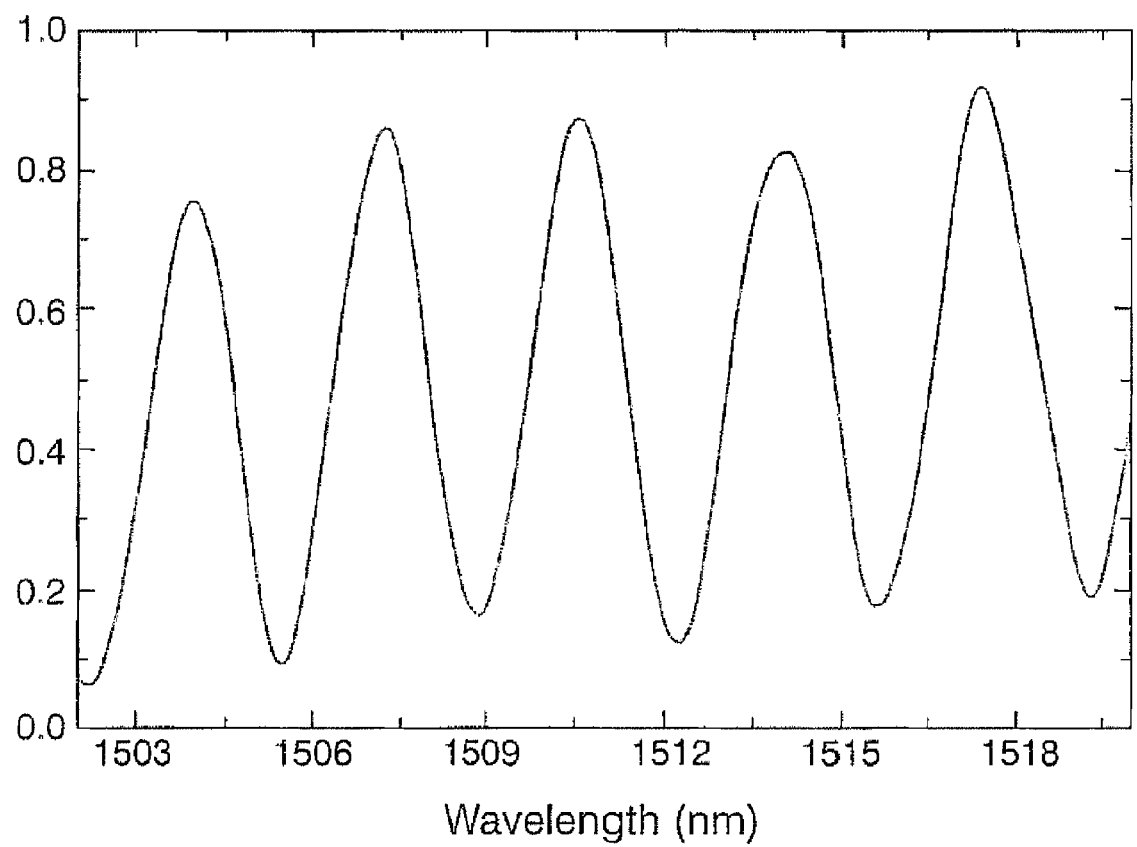
FIG. 6 shows a graphical representation of the normalized transmitted power of the all-micro-structured optical fiber interferometer with length L=7.5 cm, according to another possible embodiment of this invention, as a function of the wavelength, expressed in nanometers.

The interferometer is also tested at longer wavelengths, in the near-infrared region of the spectrum, up to 1600 nm, knowing that most MOFs exhibit single mode behavior in a broad range of wavelengths. For this purpose, a tunable laser is used as a light source and the output optical power is measured with an InGaAs photodetector. In FIG. 6, a series of maxima and minima are observed at wavelengths around 1510 nm. This single-frequency sinusoidal interference pattern indicates that only two modes interfere, due to their phase velocities and the phase difference are wavelength dependent. The fringe visibility is calculated to be about 80%. The visibility is better due to the high coherence of the 1500 nm laser. The average period of the interference spectrum shown in FIG. 6 is 3.1 nm. Note from FIG. 4 that the period at 850 nm of the device with L=7.5 cm is 2.6 nm. This indicates that the period of all-MOF interferometers constructed with splices increases with the wavelength.

Figure 7:
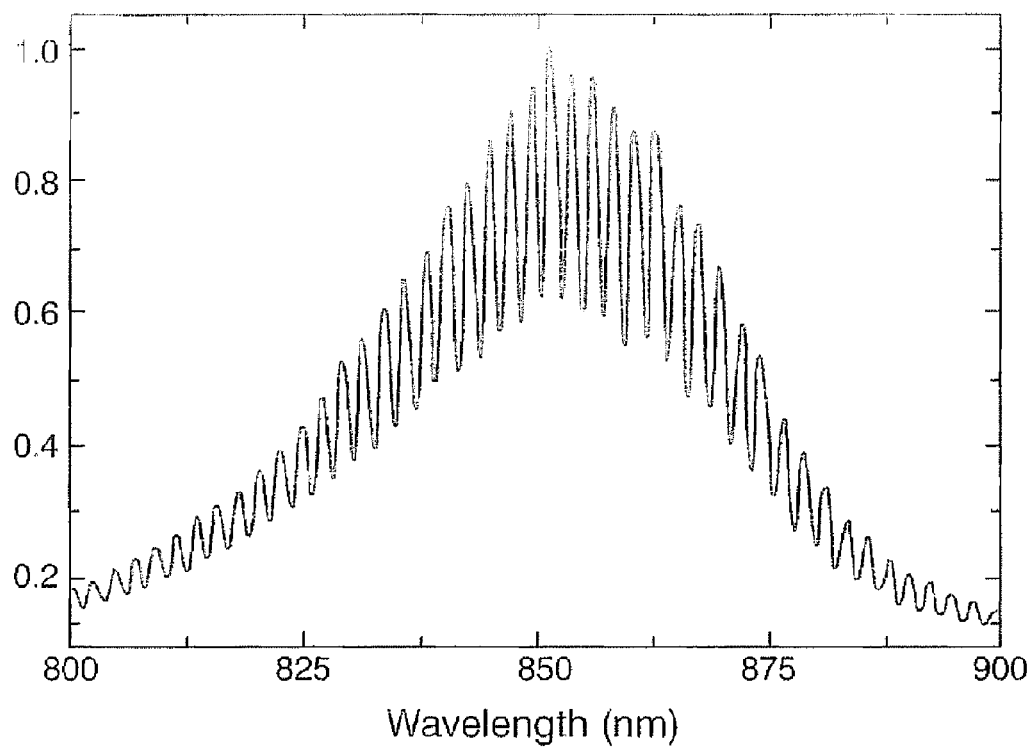
FIG. 7 shows normalized interference spectra of an interferometric strain sensing device based on the all-micro-structured optical fiber interferometer with a length of L=8.6 cm, according to another example for embodiment of the invention, subjected to micro elongation from 0 (solid line) to 750µε (dotted line), referring the unit µε to microstrain defined as $10^{-6}$ times the length change per unit length, i.e., $1µε=10^{-6} \cdot \delta L/L$.
Figure 8:
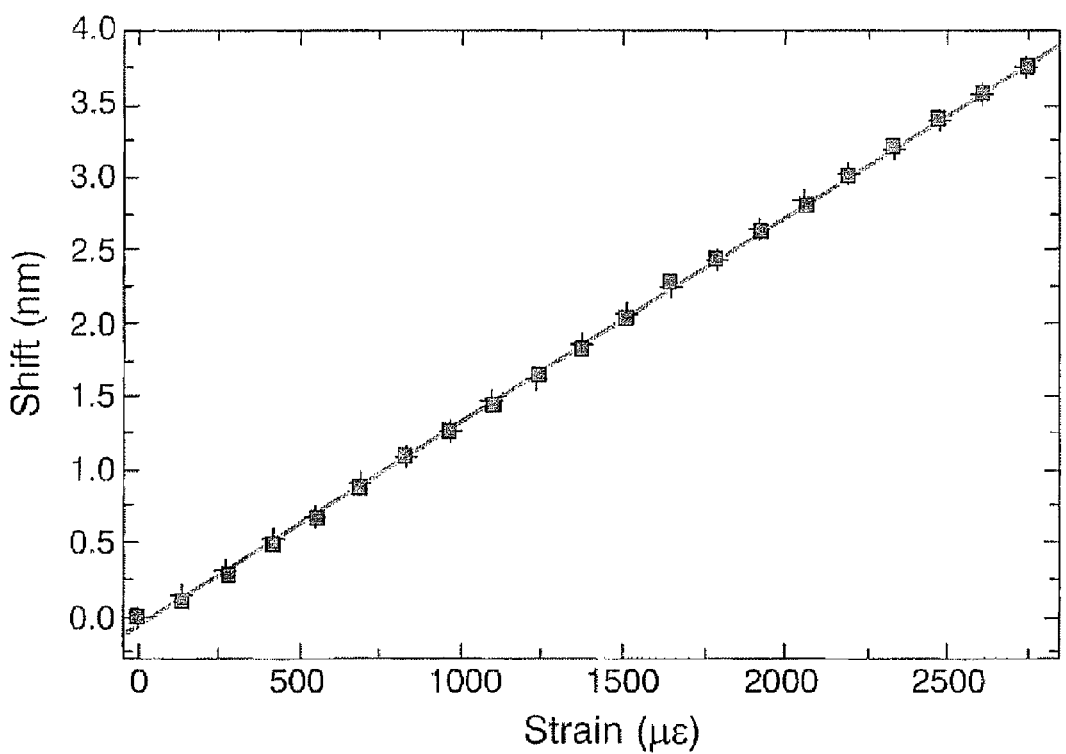
FIG. 8 shows a graphical representation of the shift that the interferometric strain sensing device experiments in the interference spectrum when a micro elongation of 750µε is applied, shown in the previous figure, as a function of the applied (squares) or removed (crosses) strain, being the continuous line a linear fitting to the experimental data.

Thanks to the displacement of the interference pattern when the interferometer is straightened and subjected to longitudinal strain, the device can also be used as an intensity-modulated strain sensor, which is an alternative to the wavelength-encoded strain sensor. FIG. 7 shows such displacement of the interference pattern of an all-MOF interferometer having length L=8.6 cm. To introduce micro elongations to the device, it is secured between two displacement mechanical mounts separated a distance of 8 cm for ensuring that only the length (L) of MOF between the splices is subjected to the applied strain. The interference spectrum is shifted when the device is under strain, as shown in FIG. 8. It is worth noting the linear behavior of the device as well as its reversibility.

For a central wavelength ($\lambda$) of the light source, measured in nanometers, the fringes of the interference spectrum are spaced in a measurement comparable to the best-behavioral interferometers, showing a fringe spacing of about $\lambda/300$. Shifts of the interference spectrum around $\lambda/4000$ can be detected.

The interferometer and sensing devices that this invention proposes can operate in a wide temperature range, from −40° C. up to 1000° C., so the present invention is suitable for hostile working environments. Note that fiber Bragg gratings start degrading when temperature is around 300° C. Another property of robustness is the independence from light polarization, thus such devices are able to work with a remote light source launching light from long distances without the need of using expensive polarization maintaining fibres.

The invention is obviously not limited to the specific embodiments described herein, but also encompasses any variations that may be considered by any person skilled in the art (for example, as regards the choice of components, configuration, etc.), within the general scope of the invention as defined in the appended claims.

While the present invention has been illustrated and described with respect to a particular embodiment thereof, it should be appreciated by those of ordinary skill in the art that various modifications to this invention may be made without departing from the spirit and scope of the present invention.

What is claimed is:

1. An all-optical fiber interferometer comprising at least an index-guiding micro-structured optical fiber, which in turn comprises a solid core surrounded by a cladding with at least four rings of air-holes, comprising two splices of said micro-structured optical fiber with respective single-mode optical fibers and said splices determining two regions wherein the air-holes of the micro-structured optical fiber are collapsed, being the center-to-center separation between said two regions a length (L) of the micro-structured optical fiber along which two electromagnetic modes are excited.

2. The all-optical fiber interferometer according to claim 1, wherein at least one of the single-mode optical fibers is a microstructured optical fiber.

3. The all-optical fiber interferometer according to claim 1, wherein at least one of the single-mode optical fibers is a conventional optical fiber.

4. The all-optical fiber interferometer according to claim 1, wherein the two excited electromagnetic modes are the cladding mode and the core mode.

5. The all-optical fiber interferometer according to claim 1, wherein the length (L) of the micro-structured optical fiber along which the two electromagnetic modes are excited is 10 centimeters or less.

6. The all-optical fiber interferometer according to claim 1, wherein the two splices of the micro-structured optical fiber is performed by a standard fusion splicer machine.

7. The all-optical fiber interferometer according to claim 1, wherein said interferometer is a Mach-Zehnder interferometer.

8. The interferometric strain sensing device comprising the all-optical fiber interferometer defined according to claim 1, and at least one lineal moving element attached to at least one point of said all-optical fiber interferometer for straightening of the micro-structured optical fiber and introduction of micro elongations to the length (L) of said micro-structured optical fiber.

9. A method for construction of an all-optical fiber interferometer, comprising the following steps:
   cleaving an index-guiding micro-structured optical fiber, which comprises at least four rings of air-holes, and two single-mode optical fibers;
   fusion splicing the index-guiding micro-structured optical fiber with the two single-mode optical fibers, being the center-to-center separation between the two splices of said index-guiding micro-structured optical fiber a length (L) of 10 centimeters or less;
   in each of the two splices, tapering the air-holes of said index-guiding micro-structured optical fiber until total collapse.

10. The method according to claim 9, wherein a heating time and an electric current for the fusion splicing step are applied to the index-guiding micro-structured optical fiber which are approximately 50% of the heating time and electric current used for conventional fusion splicing of optical fibers.

\* \* \* \* \*